(12) United States Patent
Almohammad-Albakkar et al.

(10) Patent No.: US 12,535,116 B1
(45) Date of Patent: Jan. 27, 2026

(54) RADIALLY PERFORATED DAMPER FOR BEAM TO COLUMN DAMPING

(71) Applicant: UNIVERSITY OF SHARJAH, Sharjah (AE)

(72) Inventors: Mohammad Almohammad-Albakkar, Sharjah (AE); Zaid Al-Sadoon, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 19/006,705

(22) Filed: Dec. 31, 2024

(51) Int. Cl.
*E04H 9/02* (2006.01)
*E04B 1/24* (2006.01)
*E04B 1/98* (2006.01)
*F16F 7/12* (2006.01)

(52) U.S. Cl.
CPC ............. *F16F 7/12* (2013.01); *E04B 1/98* (2013.01); *E04H 9/02* (2013.01); *E04H 9/021* (2013.01); *E04H 9/024* (2013.01); *F16F 2230/36* (2013.01); *F16F 2236/10* (2013.01)

(58) Field of Classification Search
None
See application file for complete search history.

(56) References Cited

U.S. PATENT DOCUMENTS

| | | | | | |
|---|---|---|---|---|---|
| 1,536,717 | A | * | 5/1925 | Krekel | F17B 1/00 52/657 |
| 1,654,320 | A | * | 12/1927 | Colby | H01H 37/54 200/402 |
| 1,787,167 | A | * | 12/1930 | Purdy | E04B 1/2604 16/249 |
| 2,604,316 | A | * | 7/1952 | O'Brien | F16F 1/322 200/83 B |
| 2,815,831 | A | * | 12/1957 | Hield | E04B 7/022 52/639 |
| 2,871,997 | A | * | 2/1959 | Simpson | E04B 1/24 52/654.1 |
| 3,623,286 | A | * | 11/1971 | Parduhn | E01F 9/635 52/99 |
| 4,397,370 | A | * | 8/1983 | Smith | B60F 3/003 405/197 |
| 5,855,443 | A | * | 1/1999 | Faller | E01F 9/635 248/548 |
| 6,681,538 | B1 | * | 1/2004 | Sarkisian | E04C 3/06 52/289 |
| 6,705,813 | B2 | * | 3/2004 | Schwab | F16B 43/00 411/526 |

(Continued)

*Primary Examiner* — Phi D A
(74) *Attorney, Agent, or Firm* — MH2 Technology Law Group, LLP

(57) ABSTRACT

The present disclosure discloses a radially perforated damper for damping relative movement between a beam and a column. The radially perforated damper comprises at least two radially perforated damping plates, each radially perforated damping plate comprising a central connecting portion configured to rigidly connect to the beam. Each damping plate also comprises a plurality of radial strips extending radially from the central connecting portion such that when an external force is applied to the beam or column, and a moment is applied to the central connecting portion, each radial strip of the plurality of radial strips experiences shear stress and undergoes plastic deformation, thereby damping relative movement between the beam and column.

9 Claims, 7 Drawing Sheets

(56) References Cited

U.S. PATENT DOCUMENTS

| | | | |
|---|---|---|---|
| 7,647,734 B2* | 1/2010 | Sarkisian | E04H 9/0237 248/220.21 |
| 8,234,827 B1* | 8/2012 | Schroeder, Sr. | E04B 1/24 52/638 |
| 10,294,656 B2* | 5/2019 | Fox | E04B 1/2403 |
| 10,547,162 B1* | 1/2020 | Lukovic | H02G 3/0608 |
| 2005/0005561 A1* | 1/2005 | Hanson | E04B 2/707 52/633 |
| 2007/0209314 A1* | 9/2007 | Vaughn | E04B 1/24 52/838 |
| 2007/0292204 A1* | 12/2007 | Hackney | E04B 1/10 403/93 |
| 2008/0289267 A1* | 11/2008 | Sarkisian | E04H 9/0237 52/167.3 |
| 2009/0100796 A1* | 4/2009 | Denn | E04B 1/18 52/745.12 |
| 2011/0030305 A1* | 2/2011 | Karns | E04B 1/2403 52/655.1 |
| 2015/0159369 A1* | 6/2015 | Chen | E04B 1/2403 52/167.8 |
| 2015/0275501 A1* | 10/2015 | Houghton | E04H 9/024 52/854 |
| 2017/0268224 A1* | 9/2017 | Sato | E04H 4/148 |
| 2018/0223521 A1* | 8/2018 | Uno | E04B 1/215 |
| 2018/0245329 A1* | 8/2018 | Yu | E04B 1/1903 |
| 2018/0347222 A1* | 12/2018 | Richards | E04H 9/021 |
| 2019/0100935 A1* | 4/2019 | Staszczyk | E04B 1/08 |
| 2019/0143462 A1* | 5/2019 | Simmons | E04B 1/14 269/153 |
| 2019/0257071 A1* | 8/2019 | Green | E04B 1/2403 |
| 2020/0318342 A1* | 10/2020 | Onishi | E04B 1/5812 |
| 2020/0362561 A1* | 11/2020 | Currie | E04C 2/38 |
| 2021/0095463 A1* | 4/2021 | Jiang | F16F 7/00 |
| 2021/0131099 A1* | 5/2021 | Kossman | E04C 3/11 |
| 2021/0140167 A1* | 5/2021 | Adams | E04H 9/021 |
| 2022/0259844 A1* | 8/2022 | Pryor | E04C 3/40 |
| 2022/0333369 A1* | 10/2022 | Richards | E04B 1/2403 |
| 2023/0003243 A1* | 1/2023 | Del Rio | F16B 7/0486 |
| 2024/0337099 A1* | 10/2024 | Boyd | E04B 1/2403 |
| 2024/0392567 A1* | 11/2024 | Felix | E04B 1/30 |

* cited by examiner

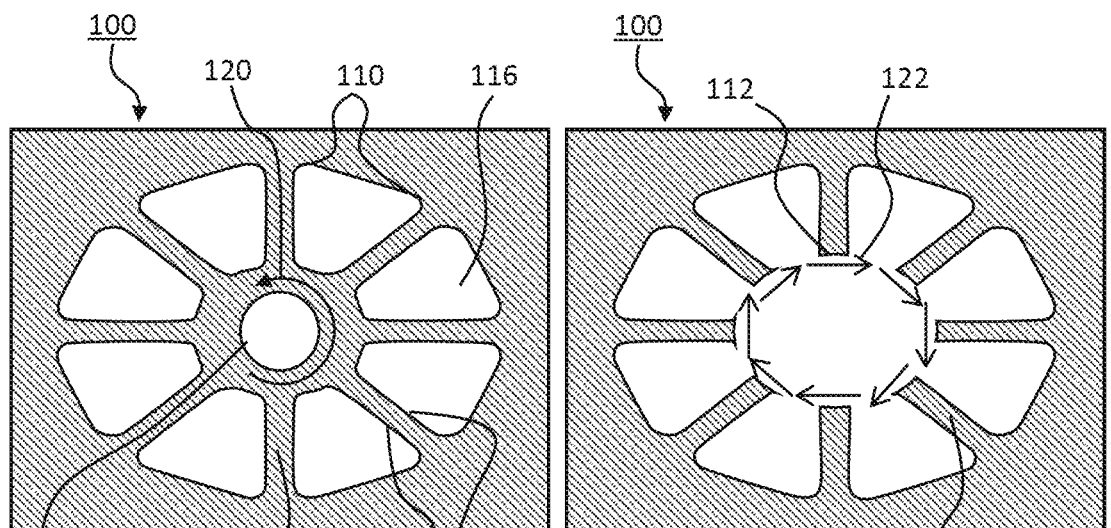
Fig. 1A
Fig. 1B
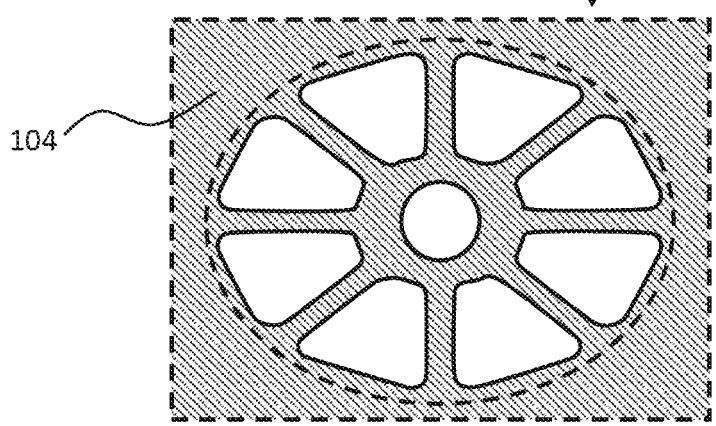
Fig. 1C
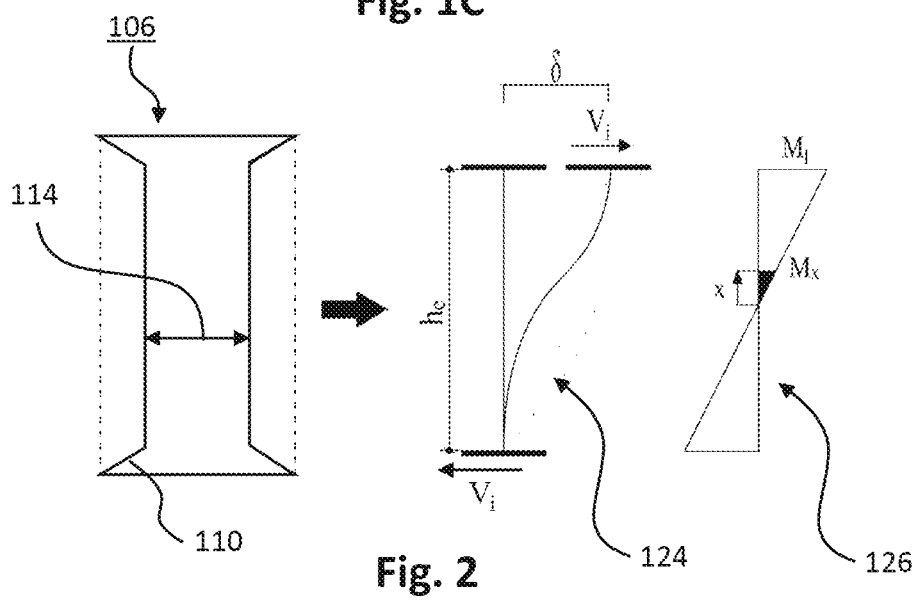
Fig. 2

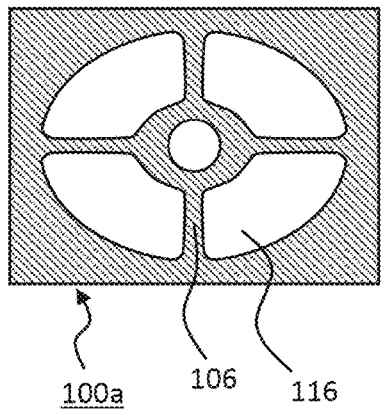
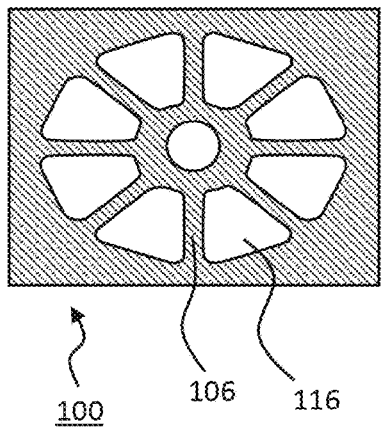
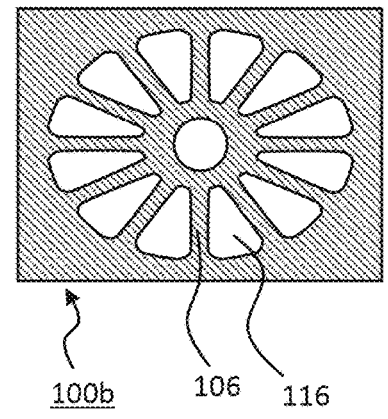
Fig. 7A　　　　　　Fig. 7B　　　　　　Fig. 7C
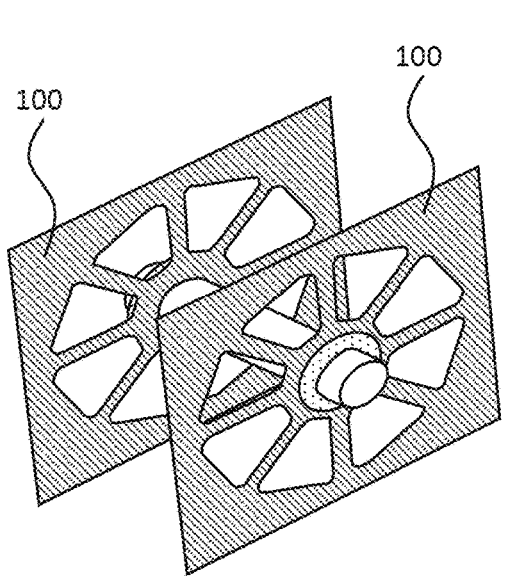
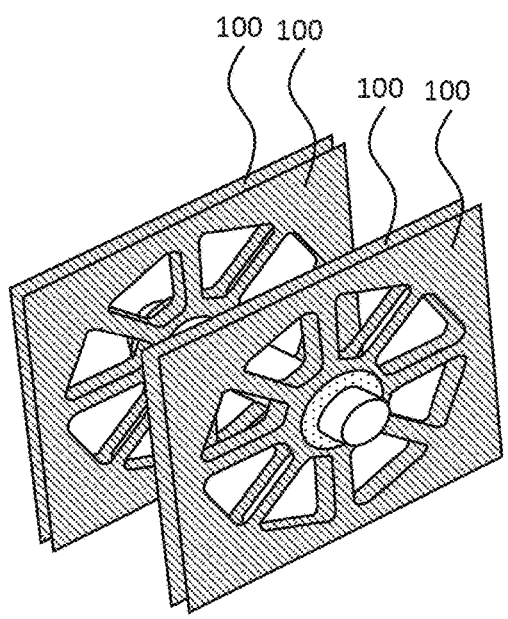
Fig. 8A　　　　　　Fig. 8B

RADIALLY PERFORATED DAMPER FOR BEAM TO COLUMN DAMPING

FIELD

The present disclosure concerns a damper and a method of damping a structure. More specifically, but not exclusively, the present disclosure concerns a radially perforated damper for damping relative movement between beam and a column.

BACKGROUND

Background description includes information that will be useful in understanding the present invention. It is not an admission that any of the information provided herein is prior art or relevant to the presently claimed invention, or that any publication specifically or implicitly referenced is prior art.

Damping is a technique used when constructing buildings, large buildings in particular, to mitigate the effect of external forces on the structure of the building. Typical examples of such forces include earthquakes. To prevent collapse of buildings during earthquakes, damping techniques are employed to either stiffen the structure of the building, or to dissipate kinetic energy to prevent excessive movement and oscillation.

Numerous steel structures have been exposed to significant damage and even collapse of their prominent structural members. This phenomenon became particularly evident following the Northridge and Kobe earthquakes, for example. These failures often occur in the connections of structures, particularly in beam-to-column connections. Compromised steel structures have revealed poor seismic performance in terms of ductility and energy dissipation. In some cases, brittle failures can be observed at beam-to-column connections due to an insufficient plastic rotation capacity of the beam.

Existing systems for mitigating the effects of seismic activity are not sufficient, and experience failure at the beam-to-column connection.

The present disclosure seeks to mitigate one or more of the above-mentioned problems. More specifically, but not exclusively, the present disclosure seeks to provide an innovative damper used in a beam-to-column connection.

SUMMARY

According to a first aspect of the present disclosure, there is provided a radially perforated damper for damping relative movement between a beam and a column. The radially perforated damper comprises at least two radially perforated damping plates. Each radially perforated damping plate comprises a central connecting portion configured to rigidly connect to the beam; a continuous perimeter configured to rigidly connect to the column; and a plurality of radial strips extending radially from the central connecting portion to the continuous perimeter. Each radial strip has a pair of longitudinal edges. When a moment is applied to the central connecting portion or the continuous perimeter, each radial strip of the plurality of radial strips experiences shear stress and undergoes plastic deformation, thereby damping relative movement between the central connecting portion and the continuous perimeter.

The inventors have found that a radially perforated damper according to the present disclosure improves the ductility and energy dissipation of beam-to-column end plate connections. The radially perforated damper according to the present disclosure also achieves optimal rotation, stiffness, and connection strength.

By incorporating a damper that undergoes plastic deformation, the inventors have found that the plastic moment capacity of the structure is enhanced, and seismic energy can be dissipated through cyclic excursions within the plastic range.

The damper according to embodiments also substantially reduces story drift, which refers to the horizontal displacement between consecutive floors over the floor's height, while also lowering acceleration levels experienced by occupants during seismic events. This noteworthy improvement in both occupant comfort and safety offers a distinct advantage, especially for critical facilities like hospitals and emergency response centers.

The radially perforated plate may comprise metal.

The beam may be an "I" beam. An "I" beam may be a beam that comprises an "I" shaped cross section.

The beam may be oriented substantially orthogonally to the column. The column may be oriented substantially orthogonally to the ground.

By connecting the radially perforated damper to the beam and column, the radially perforated damper allows simple construction and retrofitting onto existing beam-to-column connections, thereby enabling augmentation of existing structures with the radially perforated damper. This retrofitting causes minimal disruption to the building's internal spaces, maintaining existing aesthetics without the need for large, visible, external bracing.

Additionally, by concentrating the damage primarily within the damper (such as during a seismic event), other structural elements remain within their elastic limits (i.e., do not undergo plastic deformation) and therefore do not need to be replaced, reducing repair time, difficulty, and wastage.

Furthermore, the use of multiple radial strips that link the central connecting portion to the continuous perimeter enables a significant portion of the radially perforated damping plates to yield simultaneously under load, significantly increasing the flexibility of beam-to-column connections. The simultaneous yielding of the radial strips ensures even dissipation of energy through each plate, for optimal damping and energy dissipation.

Advantageously, the arrangement of the radial strips may result in shear stresses being applied to the radial strips when a moment is applied to the central connecting portion.

The width of the radially perforated damper may be less than the width of the column.

The height of the radially perforated plate dampers may be equal to or greater than that of the beam.

The compact size of the damper, according to embodiments of the present disclosure, is advantageous for application is structures where space is limited, and for retrofitting purposes. Alternative dampers such as viscous or friction dampers require significantly more space for their installation.

The radially perforated damper may comprise at least four radially perforated damping plates.

Advantageously, the number of plates used in the radially perforated damper can be customized based on the structural requirements. In some embodiments, the radially perforated damper may comprise at least six radially perforated damping plates.

Each radially perforated damping plate may comprise at least four radial strips.

Each radially perforated damping plate may comprise at least eight radial strips.

Each radially perforated damping plate may comprise at least ten radial strips. Each radially perforated damping plate may comprise at least twelve radial strips.

Advantageously, the number of radial strips can be chosen depending on the structural requirements of the beams. Fewer strips may be chosen if less rigidity and more plasticity is required. More strips may be chosen if more rigidity and less flexibility is required.

Each radial strip may have a proximal end and a distal end. Each proximal end may be proximal to the central connecting portion and each distal end may be proximal to the continuous perimeter.

By having a central connecting portion that is connected to the continuous perimeter only by the radial strips, it ensures that when a moment/torque is applied to the damper, the radial strips take the stress and undergo elastic and plastic deformation.

Each radial strip may comprise a pair of webbed portions at each of the proximal and distal ends, the pairs of webbed portions connecting each radial strip to the central connecting portion and the continuous perimeter, respectively.

The webbed portions strengthen the connection between the radial strip and the central connecting portion, and between the radial strip and the continuous perimeter. This also ensures that there is no point of failure at the intersection between the end of the radial strip and the central connecting portion or continuous perimeter when the radial strip is under stress.

The radially perforated damper may comprise a shaft extending between each central connecting portion.

The shaft may be configured to extend through and be rigidly connected to the beam. The shaft may be rigidly connected to each central connecting portion, such that each central connecting portion is configured to be rigidly connected to the beam via the shaft.

The use of a shaft allows movement and force from the beam to be translated and localized directly to the central connecting portion, ensuring that the radial strips of each plate is subjected to an even distribution of shear stresses.

The radially perforated damper may comprise a vertical stiffener plate configured to be rigidly connected to the beam, the vertical stiffener plate being oriented on a plane substantially parallel to each radially perforated damping plate.

The vertical stiffener plate may strengthen the web of the beam, increasing its rigidity, such that the radial strips undergo plastic deformation before any of the structural components (i.e., the beam or the column).

The radially perforated damper may comprise a horizontal stiffener plate configured to be rigidly connected to the column, the horizontal stiffener plate being rigidly connected to each radially perforated damping plate, wherein the horizontal stiffener plate is oriented on a plane substantially orthogonal to each radially perforated damping plate.

The horizontal stiffener plates advantageously strengthen the damper, ensuring that the damping plates remain in line with the plane of movement of the beam or the column.

The radially perforated damping plate may comprise metal. The metal may comprise steel.

Rigid connection may comprise welding.

According to a second aspect of the present disclosure, there is provided a damped structure comprising a beam; a column; and a radially perforated damper. The radially perforated damper comprises at least two radially perforated damping plates. Each radially perforated damping plate comprises a central connecting portion rigidly connected to the beam; a continuous perimeter rigidly connected to the column; and a plurality of radial strips extending radially from the central connecting portion to the continuous perimeter, each radial strip having a pair of longitudinal edges. When a moment is applied to a connection between the beam and the column, each radial strip of the plurality of radial strips experiences shear stress and undergoes plastic deformation, thereby damping relative movement between the beam and the column.

The beam may comprise an 'I' shaped cross-section having a webbed portion and a pair of lateral portions, wherein the radially perforated damping plates are parallel to the webbed portion.

The radially perforated damper may comprise a vertical stiffener plate rigidly connected to the webbed portion.

The radially perforated damper may comprise a horizontal stiffener plate rigidly connected to the column and each radially perforated damping plate. The horizontal stiffener plate may be oriented substantially orthogonally to each radially perforated damping plate.

Each horizontal stiffener plate may be rigidly connected to the column via a pair of triangular plate stiffeners.

Rigid connection may comprise welding.

According to a third aspect of the present disclosure, there is provided a method of damping a structure, the structure comprising a beam and a column. The method comprises installing a radially perforated damper according to the first aspect on the structure. The installing comprises rigidly connecting the central connecting portion to the beam; and rigidly connecting the continuous perimeter to the column, such that when a moment is applied to a connection between the beam and the column, each radial strip of the plurality of radial strips experiences shear stress and undergoes plastic deformation, thereby damping relative movement between the beam and the column.

The installing may comprise rigidly connecting a shaft to the beam; and rigidly connecting the shaft to each central connecting portion, such that each central connecting portion is rigidly connected to the beam via the shaft.

Rigidly connecting may comprise welding.

The method may comprise retrofitting the radially perforated damper to a pre-existing structure.

According to a fourth aspect of the present disclosure, there is provided a kit of parts for a radially perforated damper for damping relative movement between a beam and a column, the kit comprising at least two radially perforated damping plates. Each radially perforated damping plate comprises a central connecting portion configured to rigidly connect to the beam; a continuous perimeter configured to rigidly connect to the column; and a plurality of radial strips extending radially from the central connecting portion to the continuous perimeter, each radial strip having a pair of longitudinal edges.

It will be appreciated that features disclosed in relation to one aspect of the present disclosure may be applicable to another aspect of the present disclosure and vice versa.

BRIEF DESCRIPTION OF THE DRAWINGS

The manner in which the above-recited features of the present disclosure is understood in detail, a more particular description of the present disclosure, briefly summarized above, may be had by reference to embodiments, some of which are illustrated in the appended drawings. It is to be noted, however, that the appended drawings illustrate only typical embodiments of the present disclosure and are there- FIG. 1A shows a radially perforated damping plate according to an embodiment of the present disclosure.

FIG. 1B shows a radially perforated damping plate showing shear forces according to an embodiment of the present disclosure.

FIG. 1C shows a radially perforated damping plate according to an embodiment of the present disclosure.

FIG. 2 shows a radial strip and resultant load model according to an embodiment of the present disclosure.

FIGS. 7A to 7C show radially perforated damping plates with different numbers of radial strips, according to an embodiment of the present disclosure.

FIGS. 8A and 8B show radially perforated dampers with different numbers of radially perforated damping plates, according to an embodiment of the present disclosure.

Figure 3:
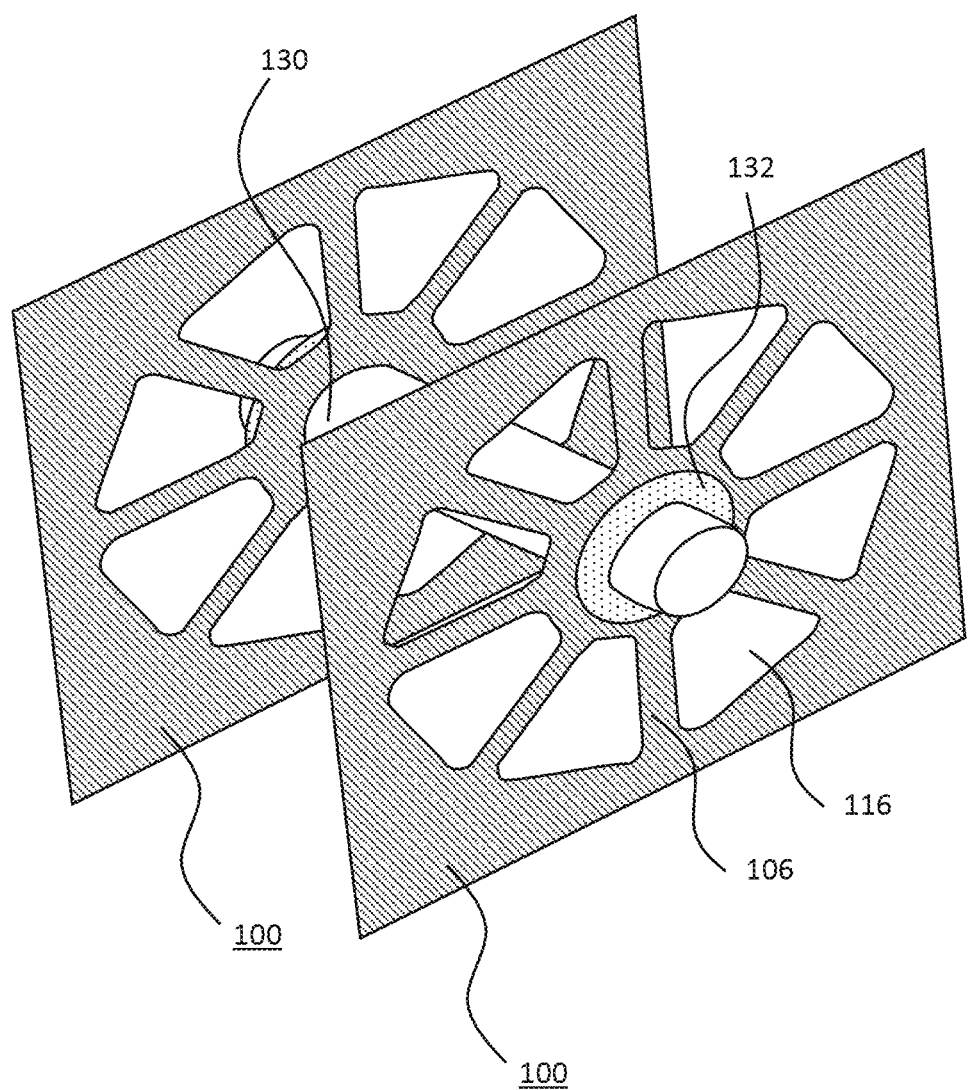
FIG. 3 shows a radially perforated damper according to an embodiment of the present disclosure.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of damping, and more particularly to a radially perforated damper for damping relative movement between a beam and a column.

The principles of the present invention and their advantages are best understood by referring to FIG. 1 to FIG. 11. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment." "an embodiment." "embodiments." or "one or more embodiments" are intended to indicate that a particular feature, structure, or characteristic described in connection with the embodiment is included in at least one embodiment of the present disclosure.

FIG. 1A shows a radially perforated damping plate 100 according to an embodiment of the present disclosure.

The radially perforated damping plate 100 has a central connecting portion 102 and a continuous perimeter 104. The central connecting portion 102 has a hole, configured to receive a shaft (not shown) that is configured to be rigidly connected therein. The continuous perimeter 104 completely surrounds the central connecting portion 102.

Connecting the central connecting portion 102 to the continuous perimeter 104 are a plurality of radial strips 106. Each radial strip 106 has a pair of longitudinal edges 108. The longitudinal edges 108 are substantially parallel to each other.

Between each radial strip 106 is a gap 116. The gap 116 is a cut out section of the plate 100. By having gaps 116 between each radial strip 106, the radial strips are able to move relative to the continuous perimeter 104 and the central connecting portion 102.

Each radial strip 106 has a webbed portion 110 at each of its proximal and distal ends. The webbed portions 110 strengthen the connection between the radial strip 106 and the central connection portion 102 and the continuous perimeter 104 respectively. The webbed portions 110 ensure that the radial strip 106 undergoes consistent deformation, and that the radial strip 106 does not have a point of failure under load, at the connection point between the radial strip 106 and either the central connecting portion 102 or the continuous perimeter 104.

The continuous perimeter is square in shape, so that it matches the geometry of 'I' beams.

The moment 120 shows the resultant moment when a load vector is applied to a connection between the beam and the column (not shown here), connected to the damper.

FIG. 1B shows a radially perforated damping plate 100 showing shear forces—122 according to an embodiment of the present disclosure.

The shear forces 122 are in the opposite direction to the resultant moment 120 (because the force on the radial strip will be opposite to the direction of the force applied by the radial strips on the central connecting portion).

The shear forces 122 are applied to the proximal end 112 of the radial strips 106. The result of this is that yielding occurs at both ends of the steel radial strips 106, effectively safeguarding the connection against brittle deterioration.

The damper according to an embodiment of the present disclosure does not require regular maintenance, and if the damper requires replacement, the means of replacement is straightforward and simple, and does not require significant structural work to be done to the building structure.

FIG. 1C shows a radially perforated damping plate 100 according to an embodiment of the present disclosure.

The continuous perimeter 104 is, in embodiments, substantially the area between the two dashed lines, completely enclosing the radial strips 106 and the central connecting portion.

FIG. 2 shows a radial strip 106 and resultant load model according to an embodiment of the present disclosure.

The radial strip 106 has a width 114. The radial strip 106 also has a plurality of webbed portions 110 that connect to the central connecting portion and the continuous perimeter.

When the radial strip 106 experiences shear force/stress as a result of a resultant moment on the damping plate 100, the shear forces Vi are exhibited at the ends of the strips 106, as shown in the force diagram 124. The standardized/equivalent length of the pliable area of the strip 106 is shown as $h_e$. The symbol δ denotes the difference in displacement from one end of the radial strip to the other.

The moment diagram 126 shows the magnitude and direction of the moment vectors applied to the radial strip. $M_1$ denotes the maximum moment vector applied to the strip, which occurs at the ends of the strip, while $M_x$ denotes the moment vector applied to the strip at a distance of x from the central point.

FIG. 3 shows a radially perforated damper according to an embodiment of the present disclosure.

The radially perforated damper has a pair of radially perforated damping plates 100. Each damping plate 100 is substantially the same in construction, having the same number of radial strips 106 and the same number of gaps 116, all being substantially the same size. The radial strips 106 are evenly circumferentially distributed around the central connecting portion, to ensure that the force is evenly distributed through the radial strips.

Each of the damping plates 100 are oriented in parallel planes to each other.

Each damping plate 100 is rigidly connected to a shaft 130 that extends through the hole in the central connecting portion 102. Also connected to both the shaft 130 and each plate 100 is a pair of welded washers 132. The washers 132 are welded to both the plate 100 and the shaft 130 so that the rigid connection between the plate 100 and the shaft 130 is secure, such that moments applied to the shaft 130 can effectively be transferred to the strips 106 within the plate 100.

In embodiments, the damping plates 100 are also directly welded to the shaft 130.

Figure 4:
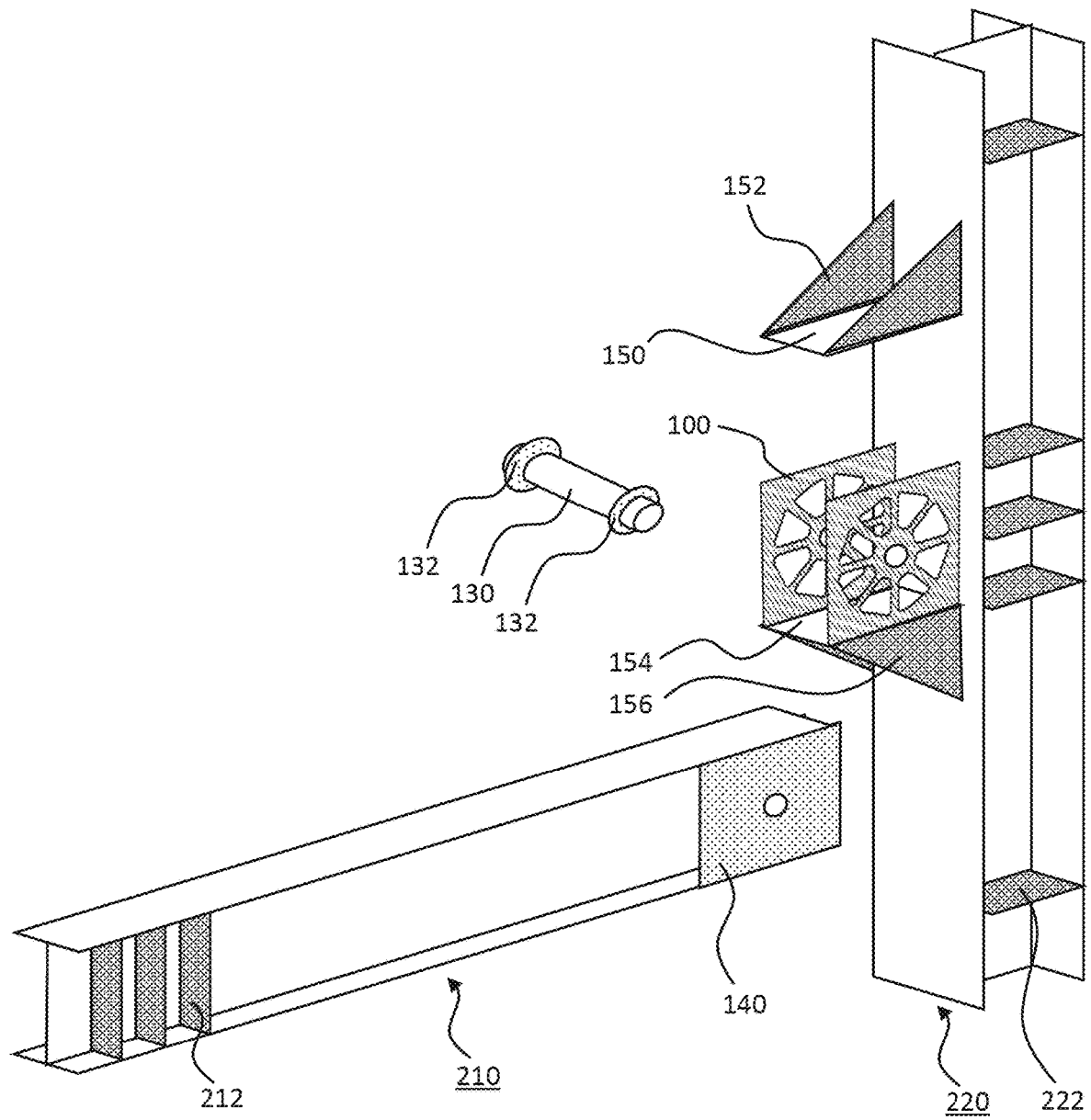
FIG. 4 shows an exploded view and method for installing a radially perforated damper on a structure, according to an embodiment of the present disclosure.

FIG. 4 shows an exploded view and method for installing a radially perforated damper on a structure, according to an embodiment of the present disclosure.

A hole (not shown) is made through the web (vertical section) of the beam 210. The beam 210 is an 'I' beam 210.

A vertical stiffener plate 140 is welded to flange of the beam 210 to provide additional strength and stiffness to the beam 210, so that the beam does not fail under load before the damper undergoes plastic deformation.

Additional stiffener plates 212 are welded to the beam 210 to provide further strength and support to the beam 210.

An upper horizontal stiffener plate 150 is welded to the column 220. A lower horizontal stiffener plate 154 is also welded to the column 220.

The upper horizontal stiffener plate 150 is further welded to the column 220 by a pair of triangular stiffener plates 152. The triangular stiffener plates further secure the horizontal stiffener plates to the column 220. The lower horizontal stiffener plate 154 is further welded to the column 220 by a pair of triangular stiffener plate 156.

The pair of radially perforated damping plates 100 are welded at their upper and lower edges to each of the two horizontal stiffener plates 150, 154. The horizontal stiffener plates 150, 154 provide additional support to the damping plates, ensuring that they remain aligned with the beam 210 for optimal transfer of force and energy into the damping plates 100.

In embodiments, the distance between the two damping plates 100 is greater than the width of the beam 210.

The shaft 130 is passed through the hole in the central connecting portion of the plate 100, through the hole in the vertical stiffener plate 140, through the hole made in the web of the beam 210, through a second stiffener plate 140 on an opposite side (not shown) of the beam 210, and through the hole in the central connecting portion of the second plate 100 (located on the opposite side of the beam 210.

In embodiments, the shaft 130 is first fed through the hole in the web of the beam 210, with the shaft 130 being welded to the web of the beam 210. In embodiments, the vertical stiffener plates are then placed over each end of the shaft 130 and welded to the beam 210. In embodiments, the shaft is also welded to the vertical stiffener plates. This order of operations may be chosen so that the shaft can be welded to the beam without being obstructed by the vertical stiffener plates.

A pair of washers 132 is passed over each end of the shaft 130, which is then welded to both the central connecting portion of each respective plate 100 and to the shaft 130. The shaft is also welded to the central connecting portion of each plate 100.

In embodiments, neither the central connecting portion of the plate, nor the plate itself, is directly welded to the beam 210.

There are additional stiffening plates 222 welded to the column 220, to ensure that the column does not fail before the damping plates 100 undergo plastic deformation.

Figure 5:
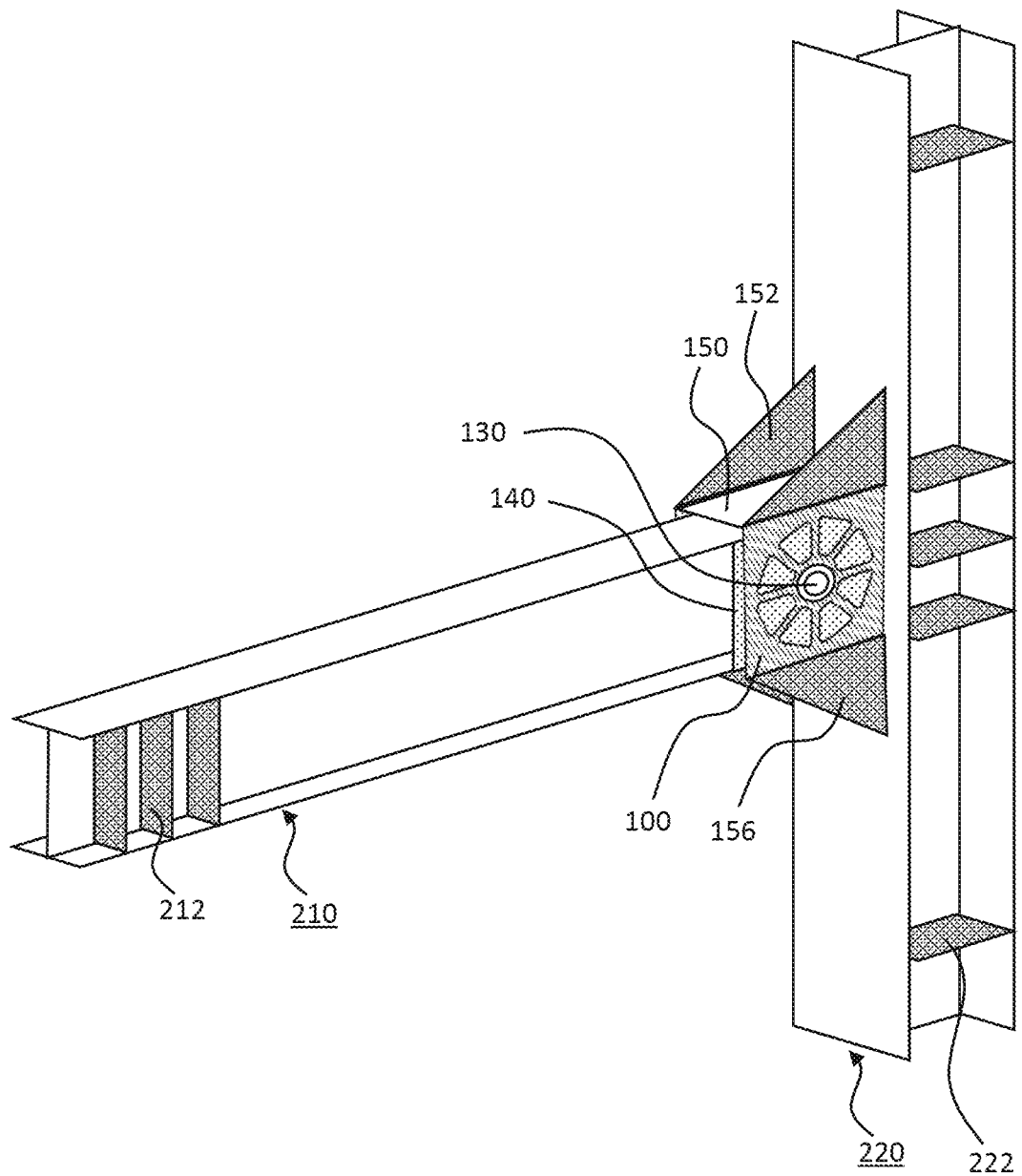
FIG. 5 shows a radially perforated damper installed on a structure according to an embodiment of the present disclosure.

FIG. 5 shows a radially perforated damper installed on a structure according to an embodiment of the present disclosure. For conciseness, duplicate features with the same reference numerals already described in preceding figures, such as FIG. 4, will not be repeated.

This figure shows the assembled article, with the damper fully installed on the beam 210 and column 220. The damper, in embodiments, includes the damping plates 100, and the shaft 130.

It can be seen that when fully installed, the damping plates 100 are positioned either side of the beam 210. The damping plates are welded to the shaft 130, with both the shaft and the damping plates welded to the washers 132. The shaft 130 is also welded to the web of the beam 210.

Figure 6:
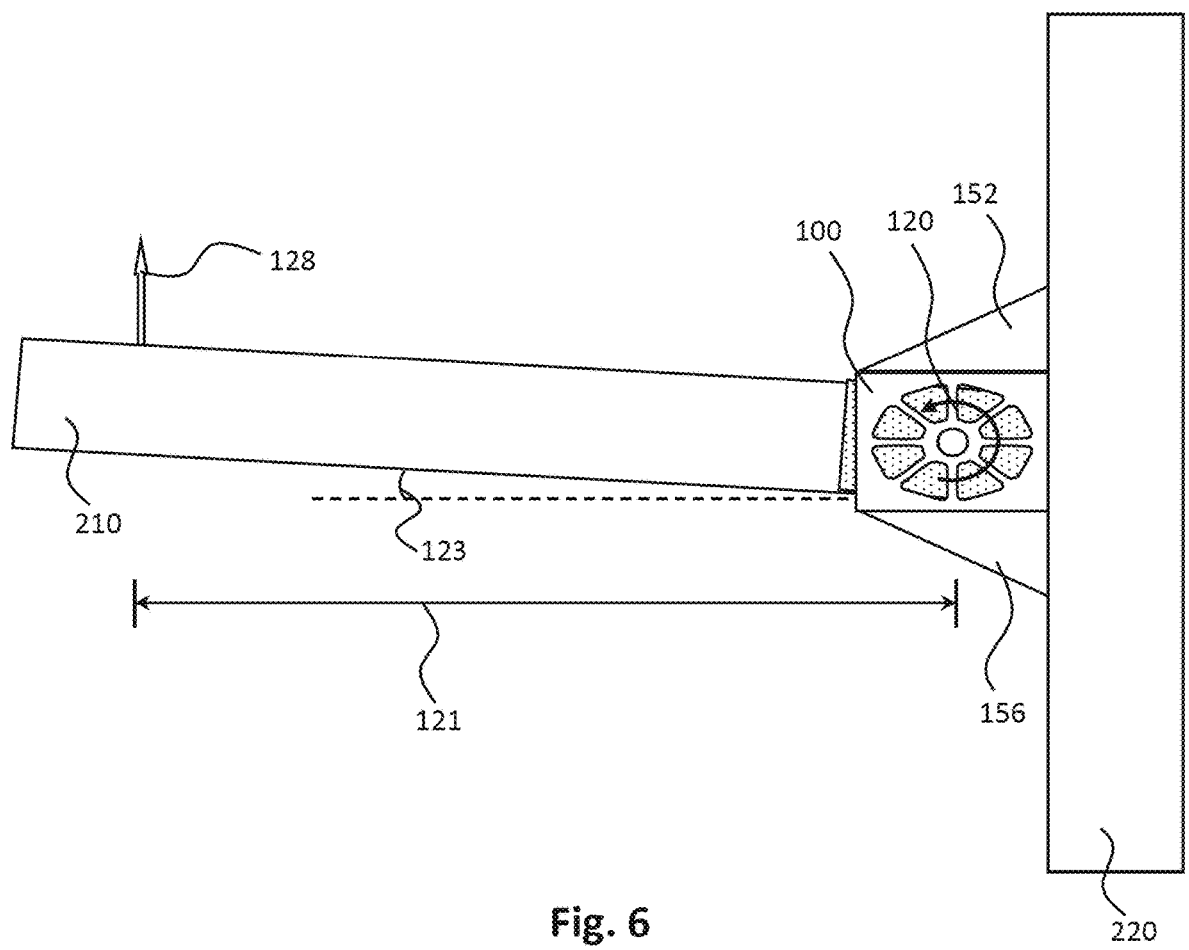
FIG. 6 shows a radially perforated damper installed on a structure subject to an external load, according to an embodiment of the present disclosure.

FIG. 6 shows a radially perforated damper installed on a structure subject to an external load, according to an embodiment of the present disclosure.

A force load 128 applied to the end of the beam 210 during an excitation event such as seismic activity results in a moment 120 being generated at the connection between the beam 210 and the damping plate 100 (the central connecting portion). The moment 120 is the product of the force 128 and the distance 121 between the force 128 and the central connecting portion of the damping plates 100. This moment 120 is in turn converted into shear forces at the ends of the radial strips 106, as shown in FIG. 1B.

The angle of deviation 123 of the beam 210 from its usual resting position as a result of the force 128 is shown.

FIGS. 7A to 7C show radially perforated damping plates with different numbers of radial strips, according to an embodiment of the present disclosure.

The damping plates 100 may be customized to the load and force requirements of the specific structure within which they are intended to be installed.

In embodiments, fewer than eight radial strips are chosen, such as in FIG. 7A. Here, the plate 100a has four radial strips 106.

In embodiments, eight radial strips are chosen, such as in the plate 100 of FIG. 7B.

In embodiments, greater than eight radial strips are chosen, such as in FIG. 7C. Here, the plate 100b has twelve radial strips 106. More radial strips may be chosen to increase the load bearing capacity of the damping plate 100b, for example when greater loads may be anticipated.

FIGS. 8A and 8B show radially perforated dampers with different numbers of radially perforated damping plates, according to an embodiment of the present disclosure.

The number of damping plates may be chosen and customized according to the load and force requirements of the specific structure within which they are intended to be installed.

In FIG. 8A, two damping plates 100 are used, where there would be one damping plate positioned on either side of the beam 210 (not shown).

To increase the loadbearing capacity of the damper, more damping plates may be deployed, such as in FIG. 8B. Here, four damping plates 100 are used, where there would be two damping plates positioned on either side of the beam 210 (not shown).

In embodiments, the multiple damping plates that are positioned on the same side of the beam would be directly adjacent each other. In embodiments, the central connecting portions of the adjacent plates are not welded to each other and are welded to the shaft extending therebetween. In embodiments, there is a washer between adjacent plates positioned on the same side of the beam, wherein the central connecting portion of each respective plate is welded to the respective intervening washer.

There may be more than four plates in total. There may be six plates. There may be eight plates. There may be ten plates. There may be greater than ten plates. The number of plates may be an even number of plates to ensure even distribution of force and energy on both sides of the beam during an excitation event such as a seismic event.

Figures 9A, 9B:
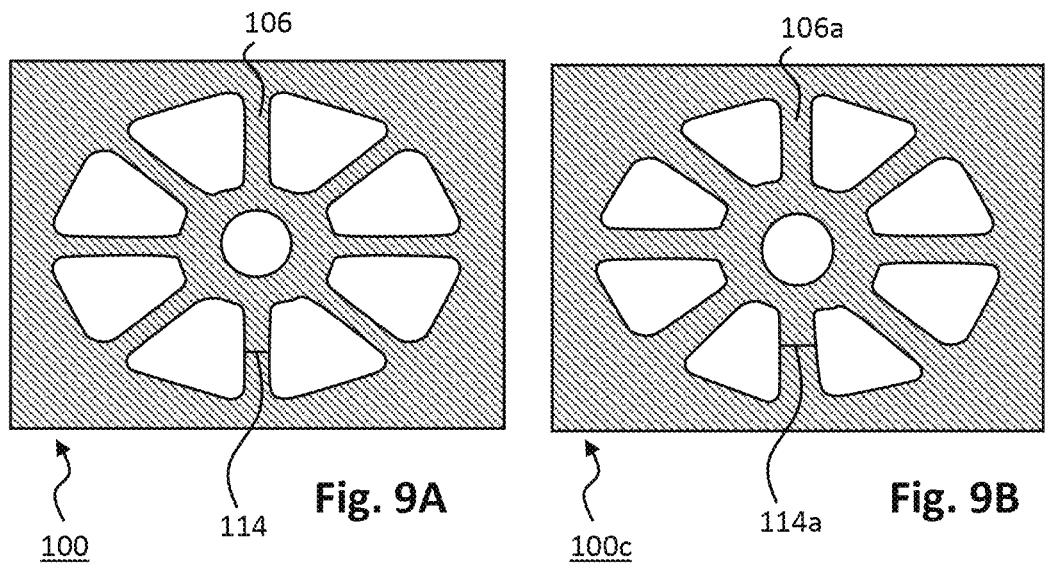
FIGS. 9A and 9B show radially perforated damping plates with different widths of radial strips, according to an embodiment of the present disclosure.

FIGS. 9A and 9B show radially perforated damping plates with different widths of radial strips, according to an embodiment of the present disclosure.

The widths of the radial strips may be chosen and customized according to the load and force requirements of the specific structure within which they are intended to be installed.

FIG. 9A shows a first width 114 of the radial strips 106. Each of the radial strips 106 within the same plate 100 has the same width 114 to ensure even distribution of force and energy into the radial strips.

FIG. 9B shows a second width 114a of the radial strips 106a. The width 114a is greater than the width 114. A smaller gap, and hence a wider strip 106a, may be chosen to increase the load bearing capacity of the plate and strips. Where greater force is anticipated, such an in areas of greater seismic activity, wider strips may be chosen so that the plates plastically deform when subjected to forces within an optimal predetermined range.

Figure 10:
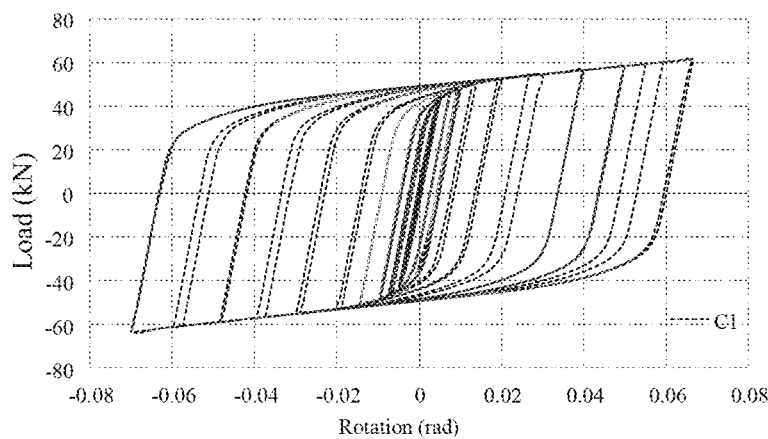
FIG. 10 shows a hysteresis curve of the radially perforated damper connection.

FIG. 10 shows a hysteresis curve of the radially perforated damper connection.

This illustrates a numerical assessment under a cyclic loading regimen devised to emulate the dynamic effects encountered during seismic episodes. The applied cyclic loading pattern is designed to encompass a spectrum of inter-story drift ratios-quantified as the lateral displacement per story height-ranging from 0.375% to an escalated scale of 0.5%, 0.75%, 1.0%, 1.5%, 2.0%, and extending up to 3% to 7%. The derivation of hysteresis curves, as delineated in FIG. 10, illustrates exemplary numerical analysis conducted.

The depicted hysteresis curve for the radially perforated damper connection illustrates the capability of the system to sustain lateral displacements within the tolerances prescribed for special moment-resisting frames, importantly, without manifesting any significant pinching phenomena or a decrement in stiffness or strength attributes. This phenomenon evidentially corroborates the structural integrity and resilience of the radially perforated damper system even amidst substantial displacements.

Figure 11:
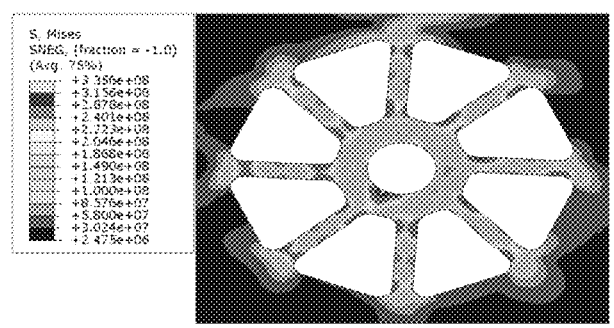
FIG. 11 shows the distribution of Von Mises in the radially perforated damping plate according to an embodiment of the present disclosure.

FIG. 11 shows the distribution of Von Mises in the radially perforated damping plate according to an embodiment of the present disclosure.

The image delineates the von Mises stress distribution within the damping plate subjected to a drift angle of 0.07 radians. Notably, the stress localization at the extremities of the strips does not precipitate any failure manifestations, thereby underscoring the robustness of the radially perforated damper in maintaining structural integrity under seismic loading conditions. It can also be seen from the figure that the stress has been evenly distributed across all of the strips in the plate, ensuring that plastic deformation occurs uniformly across the plate.

This enhanced scrutiny and presentation of the numerical analysis elucidate the effectiveness and reliability of the radially perforated damper system in seismic mitigation applications, as validated through finite element simulation outcomes. The findings affirm the premise that the radially perforated damper-equipped connections exhibit exemplary performance in strength and deformation capacity, enhancing seismic resilience in structural engineering applications.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:
1. A damped structure comprising:
 a beam;
 a column;
 a radially perforated damper comprising at least two radially perforated damping plates, each radially perforated damping plate comprising:
  a central connecting portion rigidly connected to the beam;
  a continuous perimeter rigidly connected to the column;
  a plurality of radially elongated strips extending radially from the central connecting portion to the continuous perimeter, each radially elongated strip having a pair of longitudinal edges;
 such that when a moment is applied to a connection between the beam and the column, each radially elongated strip of the plurality of radially elongated strips experiences shear stress and undergoes plastic deformation, thereby damping relative movement between the beam and the column.

2. The damped structure according to claim 1, wherein the beam comprises an 'I' shaped cross-section having a webbed portion and a pair of lateral portions, wherein the radially perforated damping plates are parallel to the webbed portion.

3. The damped structure according to claim 2, wherein the radially perforated damper comprises a vertical stiffener plate rigidly connected to the webbed portion.

4. The damped structure according to claim 1, wherein the radially perforated damper comprises a horizontal stiffener plate rigidly connected to the column and each radially perforated damping plate, the horizontal stiffener plate being oriented substantially orthogonally to each radially perforated damping plate.

5. The damped structure according to claim 4, wherein each horizontal stiffener plate is rigidly connected to the column via a pair of triangular plate stiffeners.

6. A method of damping a structure, the structure comprising a beam and a column, the method comprising:
   installing a radially perforated damper according to claim 1 on the structure, comprising:
      rigidly connecting the central connecting portion to the beam; and
      rigidly connecting the continuous perimeter to the column;
   such that when a moment is applied to a connection between the beam and the column, each radially elongated strip of the plurality of radially elongated strips experiences shear stress and undergoes plastic deformation, thereby damping relative movement between the beam and the column.

7. The method according to claim 6, wherein the installing comprises:
   rigidly connecting a shaft to the beam; and
   rigidly connecting the shaft to each central connecting portion;
   such that each central connecting portion is rigidly connected to the beam via the shaft.

8. The method according to claim 7, wherein rigidly connecting comprises welding.

9. The method according to claim 6, wherein the method comprises retrofitting the radially perforated damper to a pre-existing structure.

* * * * *